United States Patent [19]
Zettel

[11] 3,816,149
[45] June 11, 1974

[54] HYDRATED CALCIUM SILLICATE PRODUCTS

[75] Inventor: Joseph H. Zettel, Martinsville, N.J.

[73] Assignee: Johns-Manville Corporation, Greenwood Village, Colo.

[22] Filed: June 2, 1972

[21] Appl. No.: 259,164

[52] U.S. Cl.................................. 106/120, 423/331
[51] Int. Cl............................................... C04b 1/00
[58] Field of Search...................... 106/120; 423/331

[56] References Cited
UNITED STATES PATENTS
2,665,996   1/1954   Kalousek ............................ 106/120

*Primary Examiner*—Delbert E. Gantz
*Assistant Examiner*—S. Berger
*Attorney, Agent, or Firm*—Robert M. Krone; James W. McClain

[57] ABSTRACT

A process is described for the formation of shaped hydrated calcium silicate products. The process comprises reacting a concentrated aqueous slurry of calcium oxide and silica sources in the presence of high pressure saturated steam, then simultaneously cooling and diluting the resultant crystal-containing slurry by gradual addition of water. Reinforcing fibers may then be added after which the desired shapes are molded and dried.

14 Claims, No Drawings

HYDRATED CALCIUM SILLICATE PRODUCTS

BACKGROUND OF THE INVENTION

2. Field of the Invention

This invention relates to a method for the production of shaped articles formed from calcium silicate slurries.

Shaped calcium silicate products are widely used, particularly as insulation materials. These products are commonly formed by combining a source of calcium oxide, such as lime, with a siliceous material, such as sand, in the presence of water. On heating this mixture in an autoclave, a variety of crystalline forms of calcium silicate may be formed, depending upon the temperature, pressure, length of reaction time, and water concentration used. Fibrous materials, such as asbestos, which are not adversely affected by the reaction conditions may be incorporated into the mixture prior to processing. The reaction product of this processing is generally an aqueous slurry of hydrated calcium silicate crystals with which will be intermixed any fibrous components present. This slurry is cast into molds and is dried, usually by the application of heat, to form the desired finished shaped objects.

The processing to form the crystalline materials in the slurry is usually quite time-consuming and requires large and expensive pieces of processing equipment. Much effort, therefore, is directed toward improving the process conditions under which crystallization takes place and also shortening the period of time required to produce a finished hydrate. Improved processes which lessen the amount of time required to take the slurry from ambient conditions, through the crystallization step, and return to ambient conditions, would result both in more efficient and economical utilization of the equipment and also in an increased output of finished product. Consequently, a process which will accomplish all of the objects would be highly desirable.

In addition, such an improved process should seek to overcome particular processing problems found in prior art processes. One serious problem occurs upon completion of crystallization when one seeks to reduce the pressure within the autoclave and cool the slurry to return it to ambient conditions. Simply allowing the steam pressure to be reduced by cooling is very slow and inefficient, for the heat transfer from the hot aqueous slurry through the thick autoclave walls to the atmosphere is very slow. Consequently, it has been the practice of operators in the past to vent the steam pressure to the atmosphere. Since the crystallization reaction normally proceeds at temperatures well above the boiling point of water under atmospheric pressure, this sudden release of steam pressure causes the hot aqueous slurry to boil violently. This violent boiling, in turn, fractures many of the newly formed crystals, thus defeating much of the prior careful crystallization processing. Further, the venting of steam to the atmosphere is quite wasteful of heat energy.

2. Description of the Prior Art

A wide variety of crystalline forms of hydrated calcium silicate are described by Taylor, *J. of Appl. Chem.*, 10, 317 (Aug., 1960). Numerous patents disclose the hydrothermal formation of the various calcium silicate hydrates; representative examples include U.S. Reissue Pat. No. 19,005 and U.S. Pat. Nos. 2,215,891; 2,665,996; 2,699,097; 3,116,158; 3,501,324 and 3,679,446. U.S. Pat. Nos. 2,665,996; 3,501,324 and 3,679,446 also describe incorporation of fibrous reinforcements, such as asbestos or cellulose, into the slurry of initial reactants prior to the hydrothermal crystallization step.

SUMMARY

It has now been discovered that the advantages of reduced processing time, better product formation, and more efficient processing can be obtained by the process of this invention. In this process, a highly concentrated aqueous slurry of a source of calcium oxide and a siliceous material is hydrothermally reacted in the presence of saturated steam under elevated pressure in a pressure vessel to form crystalline calcium silicate. Following formation of the desired crystalline calcium silicate hydrate, the steam input is halted and low temperature water is gradually added to the reaction mixture within the pressure vessel until sufficient water has been added to dilute the crystalline slurry to the desired degree of concentration for subsequent molding operations. The incoming water condenses the steam in the pressure vessel, simultaneously reducing the pressure within the vessel and cooling the crystal-containing slurry. The gradual cooling and depressurization effectively eliminates disruption of the crystal structure formed. In addition, the period of time required to raise the reaction mixture from ambient conditions to crystallization reaction conditions is substantially reduced, for the amount of water present which must be heated is significantly less than in the prior art processes.

DETAILED DESCRIPTION OF THE INVENTION

The process of this invention permits the efficient formation of shaped calcium silicate hydrate articles which may, if desired, contain fibrous reinforcement. Processing equipment can be utilized in a more efficient manner than could the equipment for operating prior art processes, in that overall reaction times can be substantially reduced, which in turn permits increased production rates.

In addition to the substantial processing advantages, higher quality products may also be obtained by the process of this invention. The process of this invention eliminates the step required in previous processes in which high pressure steam was vented to the atmosphere at the end of the crystallization reaction to reduce the pressure within the pressure vessel. This abrupt reduction of pressure caused violent boiling in the aqueous mass of crystals, which in turn caused serious disruption and fracturing of the newly formed crystals. The process of this invention permits a gradual decrease in pressure within the pressure vessel and so avoids damaging turbulence in the crystal containing slurry.

These advantages are accomplished by the process of this invention, which is a process for forming shaped hydrated calcium silicate objects and which comprises: (a) forming a concentrated aqueous slurry of a siliceous material and a source of calcium oxide, (b) heating the concentrated slurry in a pressure vessel in the presence of saturated steam at a pressure of at least 75 psig for a period of at least one-half hour to form the desired calcium silicate hydrate crystalline forms, (c) thereafter gradually adding water to the slurry in the pressure vessel to dilute the crystal-containing slurry and to simultaneously gradually reduce the temperature and pressure within the pressure vessel to approximately ambient pressure and a temperature below 212°F, (d) removing the diluted slurry from the pressure vessel, and (e) forming it into the desired shape after which it is dried to obtain the shaped objects. If desired, fibrous reinforcement may also be incorporated into the composition either before the hydrothermal formation of crystals or following crystallization but prior to molding.

Stated in an alternate manner, the invention herein is an improvement in a process for the formation of shaped calcium silicate objects, which process comprises: forming an aqueous slurry of a siliceous material and a source of calcium oxide, heating the slurry in a pressure vessel in the presence of saturated steam at a pressure of at least 75 psig for a period of at least one-half hour to form hydrated calcium silicate crystals from the siliceous material and the source of calcium oxide, removing from the vessel the hydrated calcium silicate crystals dispersed in aqueous medium, forming the crystals into shaped objects while simultaneously separating a portion of the aqueous medium from the crystals, and then drying the shaped objects. The improvement of this invention comprises:

a. creating the aqueous slurry of siliceous material and the source of calcium oxide in concentrated form having a water:solids weight ratio in the range of 3:1 to 8:1; and b. following formation of the crystals gradually adding water to the concentrated slurry in the pressure vessel to form a dilute slurry having a water:solids weight ratio of 8:1 to 25:1 and to simultaneously gradually reduce the pressure of said saturated steam within the vessel to approximately ambient pressure, the water being cool relative to the saturated steam and thus reducing said pressure by gradual condensation of the steam and cooling of the slurry.

The hydrothermal crystallization step of this invention is conducted in a suitable pressure vessel (which normally is a conventional autoclave) with provision for agitating the slurry. The concentrated slurry containing the source of calcium oxide and the siliceous material, as well as any desired fibrous reinforcement which will not be degraded under the hydrothermal conditions, is placed in the autoclave and heated by high pressure saturated steam. The steam pressure is generally within the range of from 75 to 500 psig, preferably 100–250 psig; the temperature will be that of the saturated steam at the particular pressure (thus over this particular pressure range, the temperature will range from about 321°F. to about 470°F). The particular pressure and associated temperature which are used will be determined by the predominant type of calcium silicate hydrate crystal which is desired. The time of reaction at the operating temperature will also be determined by the type of crystal form of the calcium silicate hydrate desired. Normally, the reaction time will be between 0.5 and 20 hours, preferably 2–8 hours. The particular hydrothermal reaction conditions which favor the formation of one crystalline type over another are amply described in the art. For instance, U.S. Pat. No. 2,665,996 describes the different conditions which favor respectively the formation of a calcium silicate hydrate with the formula $4CaO \cdot 5SiO_2 \cdot 5H_2O$ or a calcium silicate hydrate with the formula $5CaO \cdot 5SiO_2 \cdot H_2O$. The patent also mentions other conditions which may lead to the formation of gyrolite, calcium silicate hydrate II, hillebrandite, and/or calcium silicate hydrate I. Similarly, U.S. Pat. No. 3,501,324 describes the conditions which lead respectively to tobermorite and xonotlite.

The slurry which contains the source of calcium oxide and the siliceous material (and perhaps fibrous reinforcement) will have a water:solids weight in range of from 3:1 to 8:1, preferably 4:1 to 6.5:1. This material is referred to herein as the "concentrated slurry." Normally the amount of water present will be no more than that sufficient to permit an adequate dispersion of the solid materials and to permit proper growth of the crystals during the hydrothermal reaction. It is a principal feature of this invention that the process does not involve the heating under pressure of any water other than that needed in order to permit proper crystal growth.

During the crystallization step, the concentrated slurry will be agitated or stirred at least part of the time. It is preferred that the agitation be moderate and constant during the crystallization step although if desired, periodic agitation can be used. In the latter case, it is preferred that the agitation be during the early portion of the crystallization step, and followed by a period of quiescence. Agitation may be by any conventional means, such as paddles, bladed mixers, and the like. The degree of agitation should be such that thorough mixing of the reactants is obtained but crystal formation is not substantially impeded. Operation of conventional agitating devices in an appropriate manner under these conditions is well within the skill of those versed in the art of mixing and need not be further detailed here.

Following completion of the crystallization step, the supply of saturated steam to the pressure vessel is stopped. The phrase "completion of the crystallization step" as used herein refers to that point at which essentially all of the desired quantity of the desired type of crystals have been obtained in the slurry. It is recognized that crystal growth does not halt instantly and that some crystal growth will continue during the cooling and water addition phase of the process. However, the amount of crystals so formed does not represent a significant addition to the crystals already present and therefore, for practical purposes, crystallization can be considered to have been completed at the time the steam is shut off and the water addition begun.

The water addition is accomplished by any convenient means. Normally this will be by a piping arrangement which permits gradual addition of cool water to the hot concentrated aqueous slurry. Alternatively or additionally, water can be introduced into the pressure vessel by means of spraying devices within the pressure vessel. In any event, introduction of the water materially cools and dilutes the concentrated slurry, while simultaneously reducing the internal pressure in the vessel by condensing the steam. The rate of water introduction is regulated to maintain the maximum rate which can be attained without serious disruption of the crystal mass. In general, this means that the water introduction rate will be such that at any given period of time the temperature of the water in the slurry will be less than the boiling temperature of water at the pressure then present in the vessel. To accomplish this, it is normally required that there be some direct cooling of the slurry itself, as by water addition directly into the slurry, rather than complete reliance upon spray condensation of the steam in the vessel. The techniques for accomplishing this controlled cooldown by water introduction are well known and are readily within the abilities of those skilled in the art of operating processes which involve the use of saturated steam. A preferred method is to introduce the water in small amounts at spaced intervals of time. For instance, the total amount of water could be added in five equal increments of one minute's addition each spaced apart by ten minute intervals.

The pressure in the pressure vessel will be reduced by the water addition to approximately ambient pressure. "Approximately ambient pressure" as used herein means a pressure not exceeding 50 psig, but preferably not exceeding 40 psig. It has been found that when the pressure in the pressure vessel is below this level, the remaining steam may be safely vented to the atmosphere with little disruption of the crystalline mass and a minimum loss of heat energy. Further, venting the remaining steam to the atmosphere once this pressure range has been reached permits significant shortening of the process cycle without serious adverse affects on the quality of the product obtained.

The water:solids weight ratio of the diluted slurry which is taken from the pressure vessel following water addition and cooling will be about 8:1 to 25:1, preferably 12:1 to 20:1. The particular concentration will be that most amenable to the specific molding and drying steps which follow. Thus, a greater degree of dilution enhances the flow properties of the calcium silicate hydrate mass, particularly if fibrous reinforcement is present. In addition, the degree of dilution obtained will be to some extent dependent upon the amount of pressure reduction and cooling required in the preceding step, as well as being in part a function of the temperature of the incoming water.

Following dilution of the concentrated slurry and attendant temperature and pressure reduction, the diluted slurry is removed from the pressure vessel and formed into the desired finished product, usually by molding and drying. If desired, fibrous reinforcement may be added prior to molding. Such reinforcement may be in addition to any fibrous reinforcement present in the initial slurry prior to crystallization or it may constitute the only fibrous reinforcement in the material. Fibrous materials which may advantageously be added following removal of the dilute slurry from the pressure vessel are those which would be adversely affected by the temperature and pressure conditions in the vessel. The dilute slurry of calcium silicate hydrate and any fibrous reinforcement can be molded readily into any desired shape by the conventional shaping processes such as compression molding, extrusion molding, casting, shaping with filter press or wet machine, etc. The molded slurry may be dried simply by allowing the slurry to stand under ambient conditions. Alternatively, the slurry may be heated in a drying atmosphere if faster drying is desired.

The source of calcium oxide of this invention may be any of the common calcareous materials such as quicklime, slaked lime, acetylene residuum, carbide residuum, etc. The siliceous material may include a natural or synthetic amorphous silica or silicate or mixtures thereof. Typical examples include quartz, silica flour, siliceous sand, diatomaceous earth, clays, silica gel, etc. Small amounts of other compounds in addition to silica may be present in the siliceous material, such as alumina, and in fact may be advantageous in the formation of particular crystalline forms of calcium silicate hydrate. The mole ratio of calcium oxide:silica will generally range from about 0.5:1 to 3.0:1 depending upon the particular crystalline hydrate desired. The mole ratio will preferably be in the range of approximately 0.75:1 to 2.0:1.

The fibrous reinforcement may be inorganic or organic fibrous materials. The inorganic materials will include asbestos fibers, rockwool, and glass fibers. The organic materials will include natural cellulosic fibers and synthetic fibrous materials such as rayons and nylons. Fibrous materials which are not adversely affected by the reaction conditions in the pressure vessels may be added either before or after the crystallization reaction. Those which are deteriorated by such conditions will be added following the crystallization reactions.

The shaped products of the process of this invention may be used directly as obtained following the drying step. They may also, if desired, be coated, painted or otherwise further prepared for their ultimate uses.

The following example will illustrate the process of this invention. To 137 gallons of water heated in a premixer to 200°F. were added 95 pounds of powdered quartz and 95 pounds of hydrated lime. These were thoroughly blended to form a concentrated slurry having a water:solids weight ratio of 5.5:1. The concentrated slurry was charged to a preheated reactor which was equipped with a variable speed bladed stirrer. The reactor was charged with steam to a pressure of 165 psig; this pressure was maintained for four hours with constant stirring of the slurry by the mixer rotating at 20 rpm. At the end of the four hours, the steam supply was shut off and cool water introduced at the rate of 40 gallons per minute for five one minute intervals, each separated by a ten minute interval; the total water addition was therefore 200 gallons. When the pressure was reduced to 35 psig, the pressure vessel was exhausted to the atmosphere. The diluted slurry was then ready for removal from the pressure vessel and formation into molded, dried shaped objects.

In another example, the crystalline calcium silicate hydrate was formed as described in the preceding paragraph. Following removal of the diluted crystalline slurry from the pressure vessel, six pounds of ⅛ inch glass fiber and four pounds of ⅜ inch 1.5 denier rayon fibers were mixed directly into the diluted slurry and thoroughly dispersed. The fiber reinforced material was then ready for molding and drying.

The fiber reinforced products of this invention normally have average densities in the range of 11.5 to 14.5 lbs/ft$^3$, modulii of rupture (dry) on the order of 100 psi, and compressive strength (dry) on the order of 180 psi. Thermal conductivity at 700°F. mean temperature is on the order of 0.7 BTU-in/hr-ft$^2$-°F. These values compare favorably with, and in some cases exceed, the corresponding values for asbestos fiber reinforced calcium silicate materials formed by prior art processes. The process of this invention, therefore, is capable of producing satisfactory (in some cases superior) calcium silicate materials for insulation and other uses while yet avoiding many of the disadvantages of the prior art processes. Most notably, the length of the overall processing cycle can be substantially reduced by the process of this invention with no adverse affect upon the product quality.

The above description details the invention and sets forth illustrative examples of materials and embodiments of the invention. It will be immediately apparent to those skilled in the art, or will become so upon practice of the invention, that there are numerous other embodiments clearly within the scope and spirit of this invention. Consequently, the scope of the invention is to be determined solely from the appended claims.

What I claim is:

1. In a process for the formation of shaped calcium silicate objects which comprises forming an aqueous slurry of a siliceous material and a source of calcium oxide, heating said slurry in a pressure vessel in the presence of saturated steam at a pressure of at least 75 psig for a period of at least one-half hour to form hydrated calcium silicate crystals from said siliceous material and said source of calcium oxide, removing from said vessel said hydrated calcium silicate crystals dispersed in aqueous medium, forming said crystals into shaped objects while simultaneously separating a portion of said aqueous medium from said crystals, and then drying said shaped objects, the improvement which comprises:
   a. creating said aqueous slurry of said siliceous material and said source of calcium oxide in concentrated form having a water:solids weight ratio in the range of 3:1 to 8:1; and
   b. following formation of said crystals gradually adding water to said concentrated slurry in said pressure vessel to form a dilute slurry having a water:solids weight ratio of 8:1 to 25:1 and to simultaneously gradually reduce the pressure of said saturated steam within said vessel to approximately ambient pressure, said water being cool relative to said saturated steam and thus reducing said pressure by gradual condensation of said steam and cooling of the slurry.

2. The process of claim 1 wherein said shaped objects also contain fibrous material incorporated into said concentrated slurry.

3. The process of claim 2 wherein said fibrous material comprises asbestos fibers.

4. The process of claim 1 wherein said shaped objects also contain fibrous material incorporated into the dilute slurry following removal of the dilute slurry from said vessel and prior to forming and drying of said shaped objects.

5. The process of claim 4 wherein said fibrous material is glass fiber.

6. The process of claim 4 wherein said fibrous material is rayon.

7. The process of claim 1 wherein said saturated steam is maintained during formation of said crystals at a pressure in the range of 75-500 psig.

8. The process of claim 7 wherein said saturated steam is maintained at a pressure in the range of 100–250 psig.

9. The process of claim 1 wherein the crystal formation step is continued for a period of time in the range of 0.5-20 hours.

10. The process of claim 9 wherein the crystal formation step is continued for a period of time in the range of 2-8 hours.

11. The process of claim 1 wherein said concentrated slurry has a water:solids weight ratio in the range of 4:1 to 6.5:1.

12. The process of claim 1 wherein said diluted slurry has a water:solids weight ratio in the range of 12:1 to 20:1.

13. The process of claim 1 wherein the mole ratio of calcium oxide to silica in said concentrated slurry is in the range of 0.5:1 to 3.0:1.

14. The process of claim 13 wherein said mole ratio is in the range of 0.75:1 to 2.0:1.

* * * * *